Patented Oct. 23, 1923.

1,471,792

UNITED STATES PATENT OFFICE.

JOSEPH H. HINES, OF PHILADELPHIA, PENNSYLVANIA.

PROCESS FOR APPLYING VITREOUS AND WATERPROOFING COATING TO BRICK AND BURNT-CLAY ARTICLES.

No Drawing.    Application filed March 16, 1922. Serial No. 544,334.

*To all whom it may concern:*

Be it known that I, JOSEPH H. HINES, a citizen of the United States, residing at Philadelphia, in the county of Philadelphia and State of Pennsylvania, have invented certain new and useful Improvements in Processes for Applying Vitreous and Waterproofing Coatings to Brick and Burnt-Clay Articles; and I do declare the following to be a full, clear, and exact description of the invention, such as will enable others skilled in the art to which it appertains to make and use the same.

The present invention relates to an improved process for applying vitreous and water-proofing coatings to burnt clay articles, such as bricks, tiles, and terra cotta blocks and pipes, which are used in the erection of walls, buildings, conduits, tunnels and other structures.

Heretofore, in applying vitreous and water-proofing coatings to burnt clay articles of the character above specified, it has been the custom to first make and bake the articles without the coating, then to apply the coating material to the articles, and finally bake the articles with the coating material applied until the latter become fused and incorporated with the surfaces of the articles upon which the coating is placed.

The process forming the subject matter of this invention differs from the heretofore known and used process by reason of the fact that instead of applying the coatings to the articles and then baking the articles so as to melt and fuse the coating material, it contemplates first heating the articles and then while in a heated state applying the coating material to the surfaces to be coated in a powdered form so that the heat of the articles will melt and fuse the coating material and cause it to spread and become incorporated with the surfaces of the articles.

It will thus be readily appreciated that the improved process is characterized by simplicity and easiness with which it may be carried out, and that this consequently makes the process capable of being carried out very cheaply which obviously results in the production of cheap products.

In applying vitreous and water-proofing coatings to bricks, tiles and terra cotta blocks and pipes according to the present invention, the bricks or other articles are first coated on those surfaces which are not to have the vitreous and water-proofing coating applied with clay or kaolin. The articles are then heated in a muffle, tunnel or other furnace to at least a red heat. After that has been done, they are taken from the furnace and the surfaces to which the vitreous and water-proofing coatings are to be applied are sprinkled with a suitable vitreous or water-proofing compound. The sprinkling may be carried out by the use of a suitable sieve or blast. When the powdered vitreous and water-proofing compound is sprinkled upon the hot surfaces of the articles to be coated, the heat from the articles will melt and fuse the compound and cause it to spread and become incorporated with the surfaces to which it is applied. After that has been done and the articles have been allowed to cool, the clay or kaolin may be removed from the surfaces of the articles to which it was applied. The purpose of the clay or kaolin is to prevent the vitreous and water-proofing compound from flowing upon and becoming incorporated with the surfaces of the articles upon which no vitreous and water-proofing coating is desired. Thus, those surfaces may be kept in their natural state so as to make them have the desirable qualities of being firmly bound together by plaster or mortar.

The present invention relates entirely to a process for applying vitreous and water-proofing coatings to the surfaces of burnt clay articles and not to the composition of the coating, but for the sake of clearness, it will be stated that a vitreous and water-proofing coating capable of being used in carrying out this process may consist of glass, carbonate of lead, and borax, which ingredients may be combined by first melting them together, and then grinding them to a fine powder, and which may be combined in the proportions of one-hundred pounds of glass to ten pounds each of carbonate of lead and borax. If desired, suitable coloring substance may be added to these ingredients before they are melted and ground so that the vitreous and water-proofing coating may be of a color suitable to the color of the articles with which it is to be coated. To make the composition of a blue color, a little cobalt may be used. To make it white oxide of tin may be used and to make it green oxide of iron may be used.

Other substances may be used in order to make the composition of other colors.

From the foregoing description, it will be readily appreciated that the process is a marked improvement upon those processes which have been heretofore known and used for accomplishing the same results, that it is simpler, easier and cheaper to carry out than the processes heretofore known and used, and consequently that by using it comparatively cheap products may be made.

Having described the nature of the invention and what is believed to be the best mode of carrying it out, the following claim is intended to define the novelty of the invention in such terms that latitude in the mode of carrying it out may be exercised.

What is claimed is:

A process for applying vitreous and water-proofing coating to certain of the surfaces of burnt clay articles, consisting in first coating the surfaces of the articles which are not to be coated with the vitreous and water-proofing coating, with clay or kaolin, then baking the articles in a furnace to approximately a red heat, then withdrawing the articles from the furnace, then sprinkling powdered vitreous and water-proofing compound upon the surfaces of the articles which are not coated with the clay or kaolin, and allowing the heat of the articles to melt or fuse the powdered vitreous and water-proofing compound and permit it to spread over and adhere to the surfaces of the articles which are not coated with the clay or kaolin, then allowing the articles to cool, and finally removing the clay or kaolin from the same.

In testimony whereof I have hereunto set my hand.

JOSEPH H. HINES.